(12) United States Patent
Pyle

(10) Patent No.: US 8,016,492 B2
(45) Date of Patent: Sep. 13, 2011

(54) WRIST OR ARM STRAP WITH HINGED MOUNT FOR CAMERA

(75) Inventor: Colin James Pyle, San Francisco, CA (US)

(73) Assignee: Colin James Pyle, San Francisco, CA (US)

( * ) Notice: Subject to any disclaimer, the term of this patent is extended or adjusted under 35 U.S.C. 154(b) by 0 days.

(21) Appl. No.: 12/783,531

(22) Filed: May 19, 2010

(65) Prior Publication Data

US 2010/0316369 A1 Dec. 16, 2010

Related U.S. Application Data

(60) Provisional application No. 61/187,275, filed on Jun. 16, 2009.

(51) Int. Cl.
*G03B 17/00* (2006.01)

(52) U.S. Cl. ........................................ 396/423; 224/222

(58) Field of Classification Search .................. 396/419, 396/420, 423; 224/222
See application file for complete search history.

(56) References Cited

U.S. PATENT DOCUMENTS

| | | | | |
|---|---|---|---|---|
| 1,407,239 A * | 2/1922 | Weiss | ............................... | 281/51 |
| 2,187,449 A * | 1/1940 | French | ........................... | 396/341 |
| 3,273,766 A * | 9/1966 | Cosentino | ...................... | 224/197 |
| 3,966,101 A * | 6/1976 | Taylor, III | ...................... | 224/219 |
| 5,064,109 A * | 11/1991 | Caster | ............................ | 224/267 |
| 5,400,936 A * | 3/1995 | Jones et al. | ..................... | 224/222 |
| 5,904,280 A * | 5/1999 | Chan | .............................. | 224/219 |
| 6,109,490 A * | 8/2000 | Caluori | ........................... | 224/220 |
| 6,330,961 B1 * | 12/2001 | Borja | ............................. | 224/222 |
| 6,796,467 B2 * | 9/2004 | Caldana | ......................... | 224/219 |
| 6,899,255 B2 * | 5/2005 | Pringle | .......................... | 224/221 |
| 6,955,484 B2 * | 10/2005 | Woodman | ...................... | 396/423 |
| 7,243,824 B2 * | 7/2007 | Tabata | .......................... | 224/222 |
| 7,273,321 B2 | 9/2007 | Woodman | | |
| 7,458,736 B2 * | 12/2008 | Woodman | ...................... | 396/420 |
| 2003/0044180 A1 * | 3/2003 | Lindberg | ....................... | 396/420 |
| 2004/0094584 A1 * | 5/2004 | Tabata | .......................... | 224/221 |
| 2009/0280861 A1 * | 11/2009 | Khan | .......................... | 455/556.1 |

* cited by examiner

*Primary Examiner* — Clayton E LaBalle
*Assistant Examiner* — Warren Fenwick

(57) ABSTRACT

A device capable of attaching a portable handheld camera to the wrist or arm of a human user is disclosed. The device is a multi-component detachable band of fabric or other material designed to encircle a user's wrist or arm, and hold a small handheld camera to the user's arm by way a camera mounting screw that attaches, by way of a rigid or semi-rigid hinged camera mounting bracket affixed to the band, to the camera's tripod socket. The device will often additionally contain a built-in second band of fabric or other material that can be positioned over the majority of the camera's front, and both hold the camera tightly to the user's wrist or arm when photography is not desired, as well as help protect the camera from accidental damage. The device is particularly useful for action sports photography.

20 Claims, 9 Drawing Sheets

WRIST OR ARM STRAP WITH HINGED MOUNT FOR CAMERA

CROSS REFERENCE TO RELATED APPLICATIONS

This application claims the priority benefit of U.S. Provisional Application No. 61/187,275 filed on Jun. 16, 2009, entitled "WRIST/ARM STRAP WITH HINGED MOUNT FOR CAMERA" Colin Pyle inventor, the contents of which are incorporated herein by reference.

BACKGROUND OF THE INVENTION

1. Field of the Invention

The invention is in the field of camera tripods and other supporting devices for cameras.

2. Description of the Related Art

Photography has become a major part of modern culture, and often athletes and other active individuals wish to be able to take photographs during periods of vigorous activity. Because often the individual's hands will be occupied during these periods of vigorous activity, ways must be found to mount a portable camera on the individual's body in such a way that it is both convenient for use, and at the same time otherwise does not overly interfere with the use of the photographer's hands.

Various methods have been found to support portable cameras on the body, including neck straps, wrist lanyards, and even helmet mounted cameras. Woodman in U.S. Pat. No. 7,273,321 discloses a harness system for attaching a camera to a user. However these methods suffer from various drawbacks. Neck straps allow the camera too much freedom of movement, which can be distracting and inconvenient. Helmet mounted cameras require the use of a helmet, and additionally can be difficult to precisely manipulate. Thus improved methods to mount portable cameras on a user's body are desirable.

BRIEF SUMMARY OF THE INVENTION

Here, a device capable of attaching a portable handheld camera to the wrist or arm of a user is disclosed. Since, in many embodiments, the device straps the camera around the wrist, and further allows the user good control over taking photographic shots, the device will often be referred to in the alternative as the "Wrist Shot" device or more simply as the "Wrist Shot".

The Wrist Shot device is a multi-component detachable band of fabric or other material designed to encircle a user's wrist or arm, and hold a small handheld camera to the user's arm by way of a camera mounting screw that attaches, by way of a rigid or semi-rigid hinged camera mounting bracket affixed to the band, to the camera's tripod socket. The Wrist Shot device will often additionally contain a built-in second camera strap or band of fabric or other material that can be positioned over the majority of the camera's front, and both hold the camera tightly to the user's wrist or arm when photography is not desired, as well as help protect the camera from accidental damage.

The device is particularly good for sports such as surfing, skiing, and other active sports. For example, whereas before, surfers who wished to capture the excitement and beauty of their pastime were faced with a dilemma of choosing between capturing the action or partaking in the action, now both options are possible. Because the Wrist Shot device holds the camera tightly to the user's wrist, the user now has complete use of his or her hands and arms when paddling, climbing, rowing, biking etc. Because the camera is readily available, the user can now snap a picture or video at a moment's notice. At all times the user's camera is securely fastened to the Wrist Shot device, and thus to the user's wrist or arm, so the user never has to worry about dropping the camera.

DETAILED DESCRIPTION OF THE INVENTION

Figure 1:
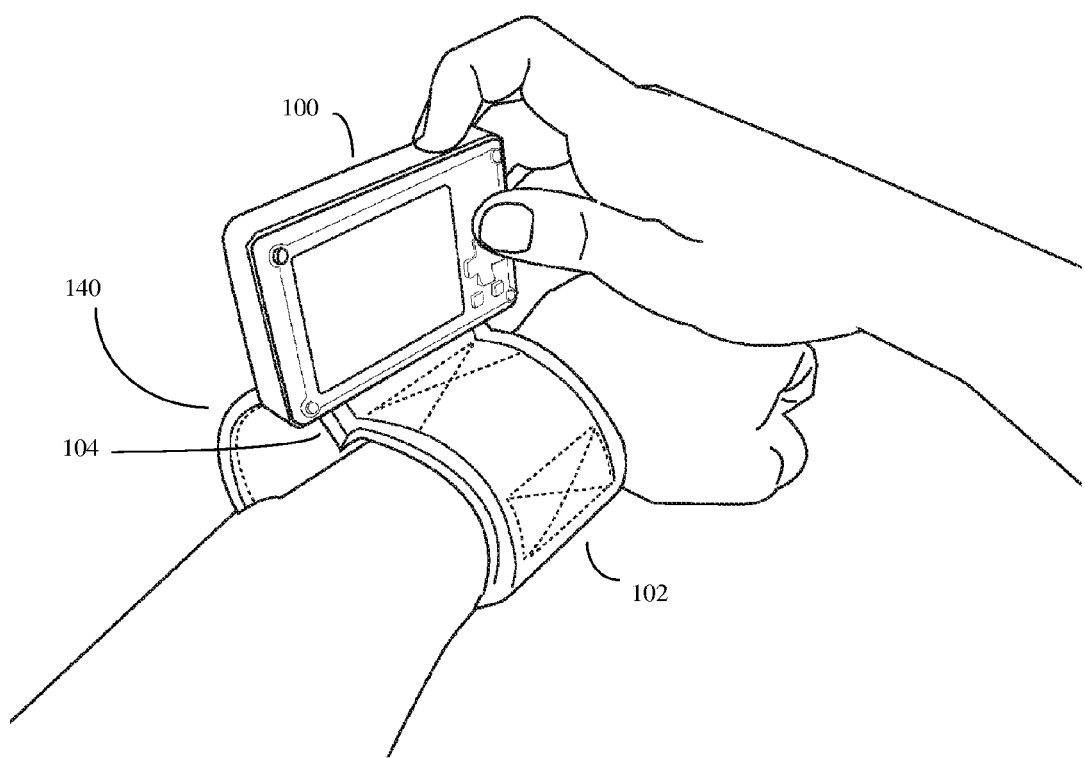
FIG. 1 shows the wrist shot device in action, where the device is holding a handheld camera to the wrist of a user, and the user is using the camera to take a photo.

In some embodiments, the invention achieves the objectives of allowing a camera to be securely attached to a person's (i.e. a human's) wrist or arm by means of a strap (first wrist strap) with an integrated hinged camera mounting bracket through which a fastener (such as a camera mounting screw) will secure a camera by utilizing the camera's existing tripod socket (standard on most handheld portable cameras). As previously discussed, in some embodiments, there will also be an attached second camera strap that will wrap over the camera, thus holding the camera firmly against the user's wrist or arm when the user is not using the camera.

This second camera strap can be temporarily attached to the first wrist strap on one side with a fabric hook-and-loop fastener material such as Velcro™, or with other types of fasteners, preferably rapid release fasteners. These fasteners will allow the user to have quick access to a camera by undoing the second camera strap, and hinging the camera into shooting position, while never being in danger of dropping the camera.

As previously discussed, the invention is particularly useful for outdoor activities and sports such as; surfing, scuba diving, mountain climbing, biking, snow skiing, or any other activity in which a user wishes to have full use of their hands while having quick access to a camera without risk of dropping the camera.

As will be discussed in more detail, the invention may be composed of many different types of materials, including fabric, leather, plastic, and even metal links. However in a preferred embodiment, the main components of the invention are made from a composite of several different water resistant, robust, synthetic fabric-like materials, often stitched or otherwise adhered together, that may include Nylon fabric belting, neoprene rubber, and fabric hook and loop fastener materials (such as Velcro™). Other materials may include a metal or resistant plastic camera mounting screws for the integrated hinged camera mounting bracket, as well as belting or other rigid or semi-rigid material to add additional rigidity to the integrated hinged camera mounting bracket.

The integrated hinged camera mounting bracket will typically contain at least one hole, and often a plurality of holes, through which a fastener, such as a screw (camera mounting screw), will hold a camera. This integrated hinged camera mounting bracket can be made out of textile, plastic, rubber, or metal, and the hinges can be made out of textile, plastic, rubber, or metal as well. In some embodiments, the hinge on the hinged camera mounting bracket will generally be parallel with the direction of the user's arm, and in some embodiments, the hinge on the hinged camera mounting bracket may be generally perpendicular (90° angle) to the direction of the user's arm. Intermediate angles and multiple hinges may also be used. In some embodiments, the hinged camera mounting bracket may also have a quick release mechanism designed to allow the camera to be rapidly attached and detached from the integrated hinged camera mounting bracket.

The handheld portable cameras suitable for the invention will normally be small film or digital cameras, generally boxlike rectangular in shape, typically with widths with approximately 2.5 to 5", heights of 1.5 to 3.5", and depths of about ¼" to 2". Often, such cameras will be about 3.5 inches wide+/−½ inch, 2.5 inches high+/−½ inch, and about ¼" to 1.5" deep.

FIG. 1 shows the wrist shot device in action, where the device is holding a handheld camera to the wrist of a user, and the user is using the camera to take a photo. In this figure, the camera (100) (which is not part of the device), the first wrist strap (102), a portion of the integrated hinged camera mounting bracket (104), and a portion of the second camera strap (140) may be seen.

Figure 2:
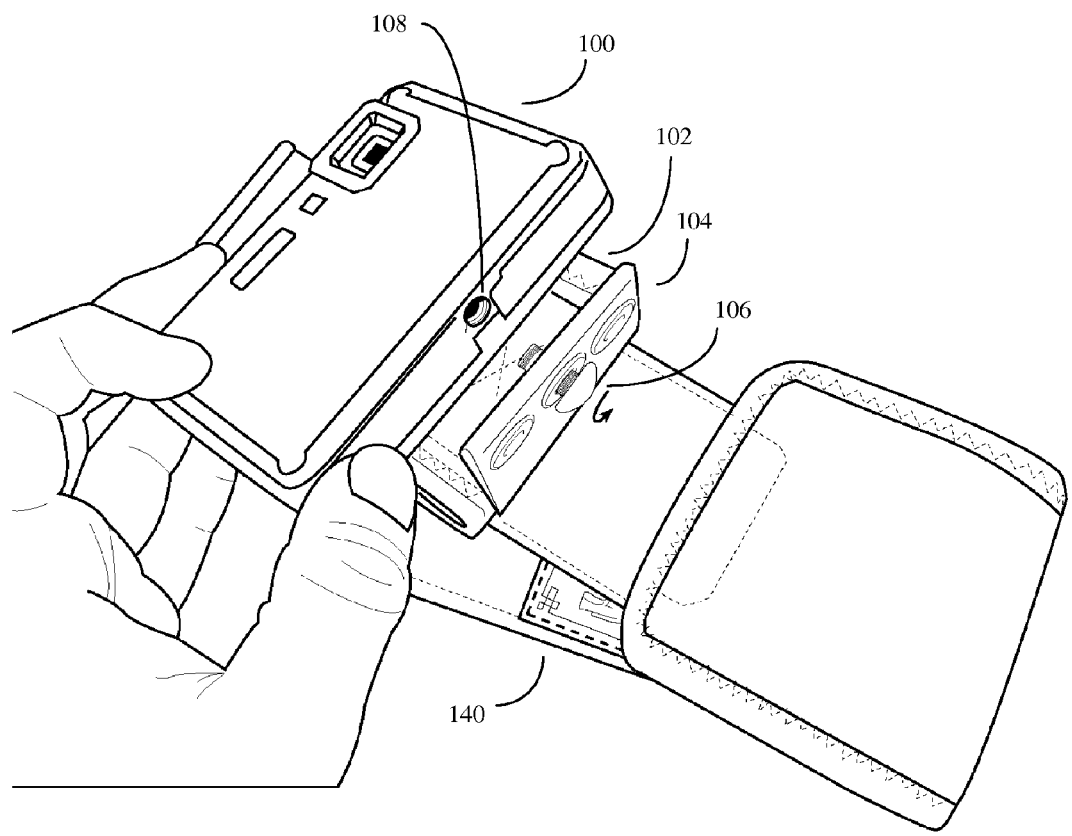
FIG. 2 shows how a camera mounting screw mounted on the wrist shot device may be screwed into the tripod socket of a handheld portable camera, thus mounting the camera on the wrist shot device.

FIG. 2 shows how a camera mounting screw (106) mounted on the hinged camera mounting bracket of the wrist shot device (104) may be screwed into the tripod socket (108) of a handheld portable camera, thus mounting the camera on the wrist shot device.

Figure 3:
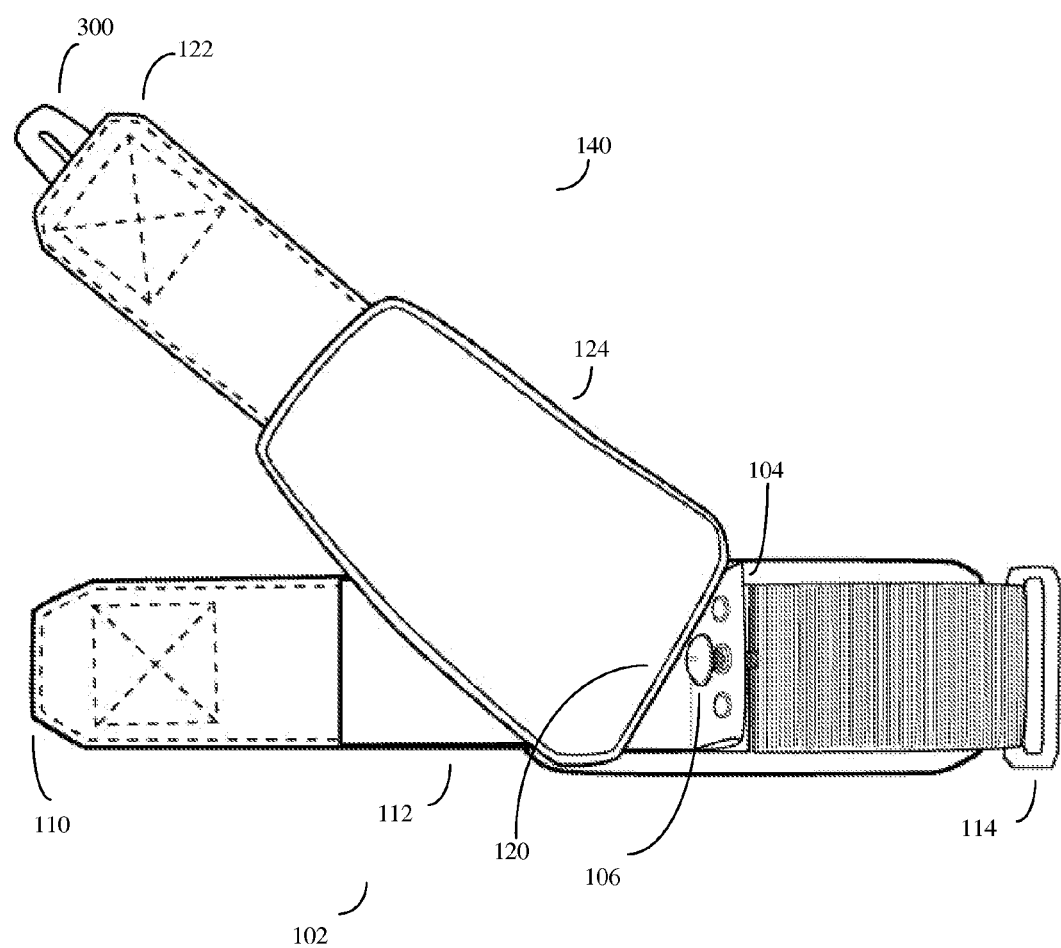
FIG. 3 shows an overview of the wrist shot device by itself (without a camera, and not placed around the wrist or arm of a user), here in a flat configuration.

FIG. 3 shows an overview of the wrist shot device by itself (without a camera, and not placed around the wrist or arm of a user), here in a flat configuration. The first wrist strap (102) has a tongue first end (110), a middle section (112) and buckle second end (114). The second camera strap (140) is attached to the middle section of the first wrist strap (102) at one end (120), and the second camera strap has an unattached third tongue end (122). The second camera strap can have an optional camera protection pad (124). An optional fabric loop (300) may be placed at the end of the second camera strap (140). The camera mounting screw (106) is shown here positioned in the middle of a series of three different holes that have been placed in the integrated hinged camera mounting bracket (104).

Figure 4:
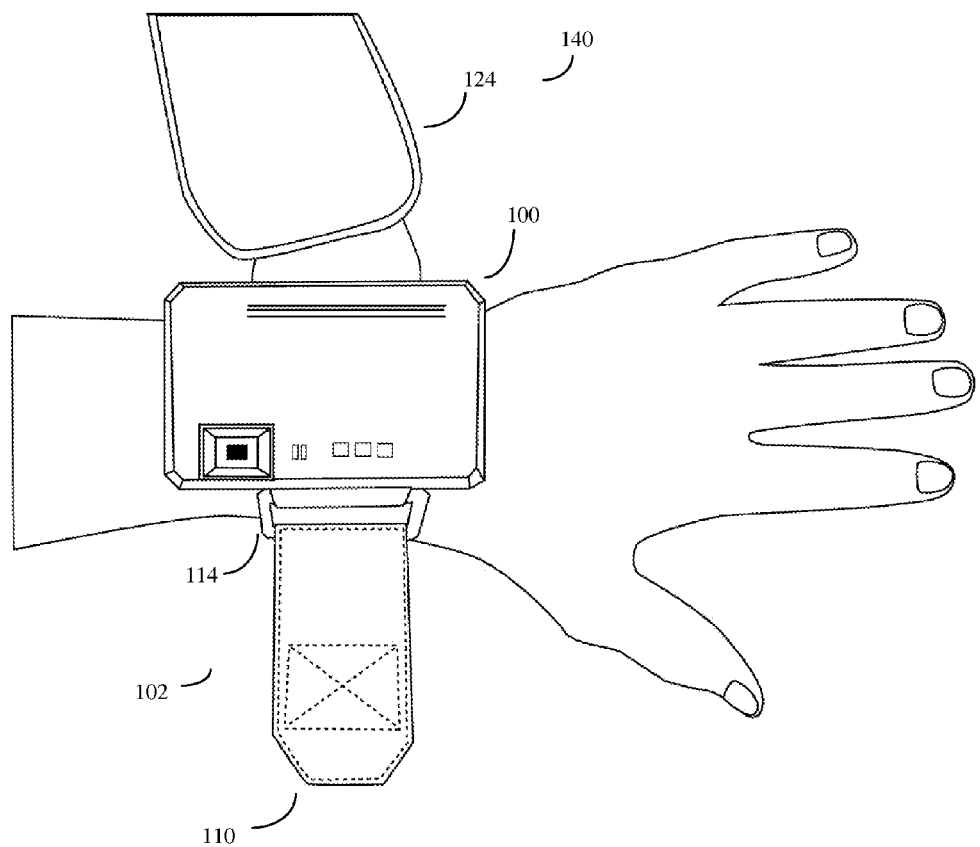
FIG. 4 shows an early step in mounting the wrist shot device around the arm of a user. Here the tongue first end of the first wrist strap has been placed through a buckle that is mounted on the second end of the first wrist strap.

FIG. 4 shows an early step in mounting the wrist shot device around the wrist or arm of a user. Here the tongue first end of the first wrist strap (110) has been placed through a buckle that is mounted on the second buckle end (114) of the first wrist strap (112).

Figure 5:
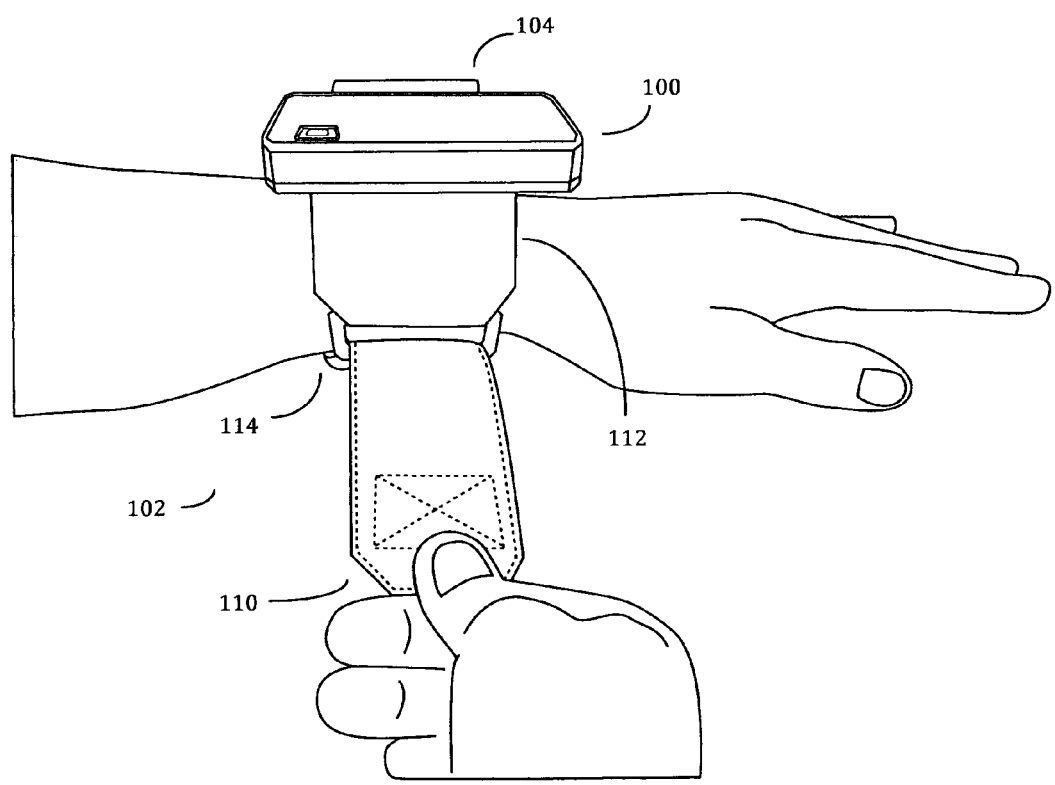
FIG. 5 shows an alternate view of an early step in mounting the wrist shot device around the arm of a user. Here the tongue first end of the first wrist strap has been placed through a buckle that is mounted on the second end of the first wrist strap. Here the tongue first end is being pulled tight.

FIG. 5 shows an alternate view of an early step in mounting the wrist shot device around the wrist or arm of a user. Here the tongue first end of the first wrist strap (110) has been placed through a buckle that is mounted on the buckle second end of the first wrist strap (114). Here the tongue first end (110) is being pulled tight. This tongue first end (110) will then be wound back around the bottom of the user's wrist where a fabric hook-and-loop surface on the tongue first end (110) will make contact with a complementary fabric hook-and-loop surface further down on the first wrist strap (102), thus forming an attachment point that will help hold the first wrist strap (102) of the wrist shot device on the wrist or arm of the user.

Figure 6:
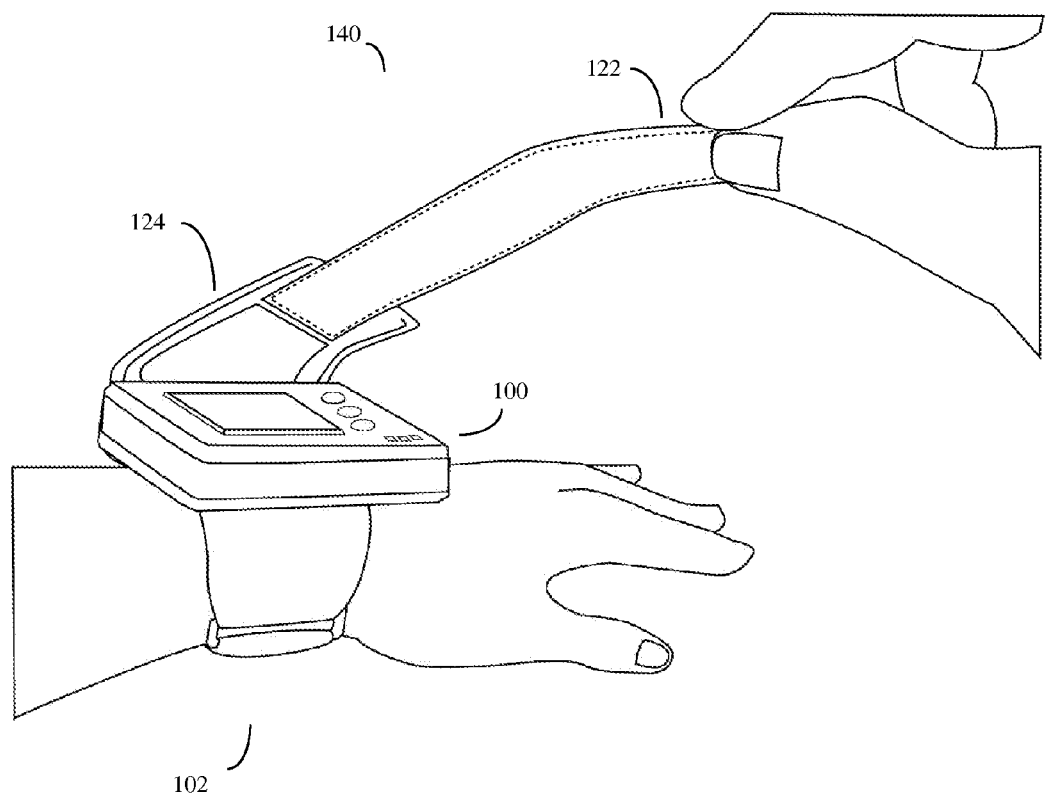
FIG. 6 shows a later stage in mounting the wrist shot device around the arm of a user. Here the second camera strap is being pulled over the camera. This second camera strap will later be used to further secure the camera to the wrist or arm of the user.

FIG. 6 shows a later stage in mounting the wrist shot device around the wrist or arm of a user. Here the second camera strap (140) is being pulled over the camera. This will later be used to further secure the camera to the wrist or arm of the user.

Thus to use the invention, typically the following steps will be followed:

The strap will often be placed flat as shown in FIG. 3, and the camera (100) will be attached by way of the camera mounting screw (106) as shown in FIG. 2. Usually the hole in the integrated hinged camera mounting bracket (104) that best centers the camera tripod socket (108) on the mounting bracket is chosen, and the camera mounting screw is tightened firmly, often by using a coin or a flat head screw driver.

Once the camera is tightened firmly on the integrated hinged camera mounting bracket (104), the device is then put on the user's wrist as shown in FIGS. 4 and 5. Usually the camera (100) is positioned on top of the user's wrist or forearm, and the tongue first end (110) of the first wrist strap (102) is placed through the buckle end (114) and tightened.

To hold the camera tightly to the user's wrist or arm when the camera is not in use, usually the second camera strap (140) is wrapped over the camera (100) as is shown in FIG. 6. Usually the user will do this by wrapping the camera protection pad (124) over the camera, and then using the third camera tongue end (122), (which often will have a fabric hook-and-loop fastener surface that is complementary to the exposed surface of the first wrist strap (102)), to wrap around the first wrist strap and adhere to the first wrist strap, thereby holding the camera protection pad (124) and second camera strap firmly in place.

To take pictures, the second camera strap (140) is simply detached from the first wrist strap (102), thereby releasing the camera protection pad (124). The user can then simply flip the camera into shooting position by moving the camera and the integrated hinged camera mounting bracket (104), up thus achieving the configuration shown in FIG. 1. The user may then take pictures.

Construction:

The device may be constructed in a variety of different ways, and using a variety of different materials. Although some specific examples and construction methods are shown below, these examples and construction methods are not intended to be limiting.

In some embodiments, the first wrist strap can be constructed from three different layers of synthetic, water-resistant, material, some of which may be fabric-like. This can be a first layer composed of a material such as neoprene (700), a second layer composed of a tough synthetic fabric (702), and a third layer composed of a fabric hook-and-loop material such as Velcro™ (800).

Figure 7:
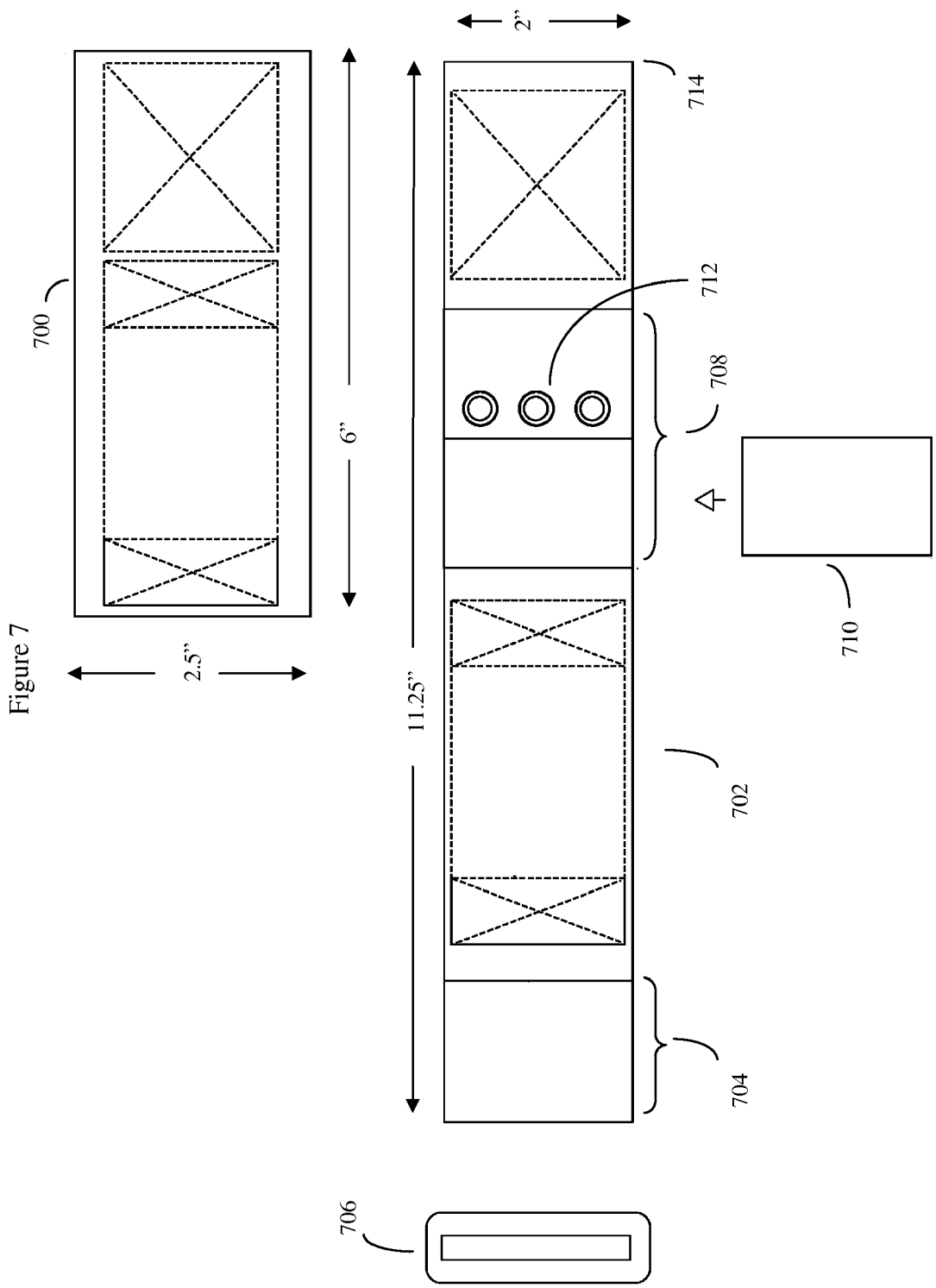
FIG. 7 shows the pattern used to construct the first wrist strap.

FIG. 7 shows an example of a pattern that may be used to construct the first wrist strap. In this embodiment, the first wrist strap consists of a neoprene strap (700) attached to a tough synthetic fabric (702) such as the seat belt webbing fabric used in automotive seat belts. The attachment is often done by sewing, an adhesive, or both. The buckle second end (114) is formed by threading a portion of the second end of the wrist strap (704) through a buckle (706) and then folding this second end back on itself and stitching or sealing the end shut, trapping the buckle (706). The integrated hinged camera mounting bracket can be formed by first folding a middle section of the wrist strap (708) back on itself and stitching or sealing this folded portion shut, forming a pocket. To make the integrated hinged camera mounting bracket generally non-bendable, a section (710) of rigid or semi-rigid material, such as drive belt material, can be inserted into this loop, and then sealed into the loop with an adhesive or other means. Holes for the camera mounting screw may then be punched through this section (712), and eyelets placed in these holes. The distal end of strap (702) is shown as (714). Some representative dimensions for these pieces are shown in the diagram (units are inches).

Although, in this embodiment, the hinge on the hinged camera mounting bracket is generally parallel with the direction of the user's arm once the first wrist strap is applied to the wrist (see FIG. 1), other embodiments are also possible. In alternative embodiments, the hinge on the hinged camera mounting bracket may be generally perpendicular (90° angle) to the direction of the user's arm. Intermediate angles and multiple hinges may also be used. In some embodiments, the hinged camera mounting bracket may also have a quick release mechanism designed to allow the camera to be rapidly attached and detached from the integrated hinged camera mounting bracket. Note also that in alternative embodiments, the hinge can be made of other materials such as rubber, metal, or plastic.

Figure 8:
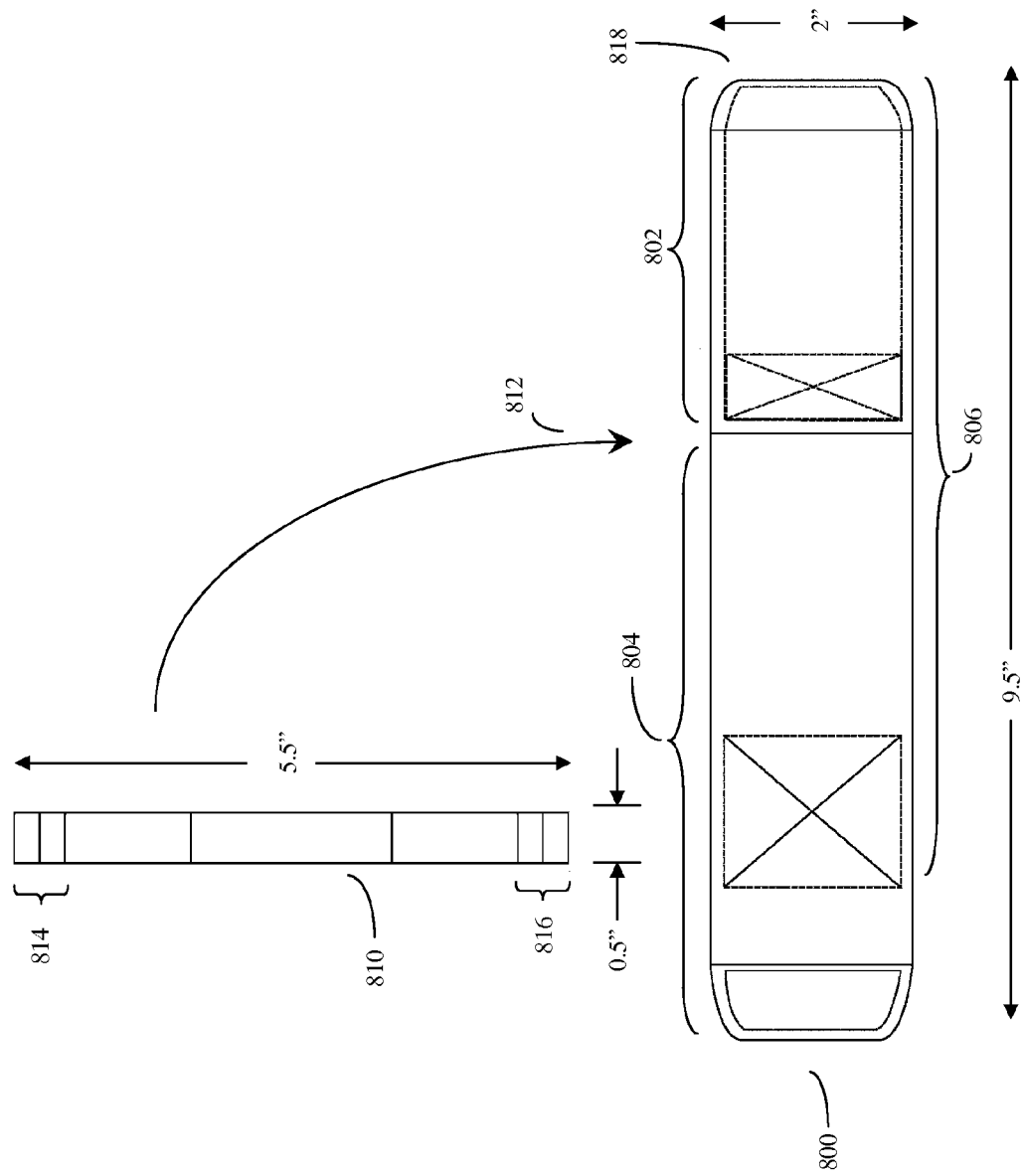
FIG. 8 shows the pattern used to construct the fabric hook and loop portion of the first wrist strap.

FIG. 8 shows the pattern of the fabric hook and loop fastener material (800) used to construct the fabric hook and loop tongue portion (110) of the first wrist strap (102). This hook and loop section can be stitched or otherwise adhered to the distal (714) portion of fabric (702). Here, for example, section (802) can correspond to the hook portion of a fabric hook and loop fastener surface, while section (804) can correspond to a complementary loop portion of a fabric hook and loop fastener surface. By contrast, on the opposite side of this surface (806), the fabric hook and loop fastener surface may again be a loop side. An optional "wing flap" fabric composed of hook and loop fastener material (810) may also be attached to this surface (800) by sewing or adhesive. This can be affixed to at least one side edge of the middle section of the first wrist strap in a position between the integrated hinged camera mounting bracket, and the tongue first end (812). This wing flap will typically be made of a fabric hook-and-loop fastener surface.

The wing flap is sewn or otherwise adhered to a middle layer formed from the junction between the neoprene layer (700) and the fabric hook and loop fastener layer (800), often around location (812), and often two ends of the wing flap will stick out over the sides of the fabric hook and loop fastener layer (800). The two ends of the wing flap (814) and (816) may further be folded back on themselves and stitched together, forming tabs. The wing flap functions as a second mechanism to hold the first strap on the user's arm or wrist. It functions as follows: when the tongue first end is fastened to the buckle second end, which in turn holds the first wrist strap to the user's arm, the wing flap(s) may in turn be folded to rest on top of a portion of the tongue end of the first wrist strap which will have a complementary hook-and-loop fastener surface. As a result, the wing flap also holds the first wrist strap to the arm of the user. As a result, the first wrist strap is held in place by two mechanisms: one is the direct adhesion between the two surfaces of the wrist strap, and the second is by the additional holding action of the wing flaps. These two mechanisms combine to make the attachment of the first wrist strap to the user's arm or wrist even more robust.

Figure 9:
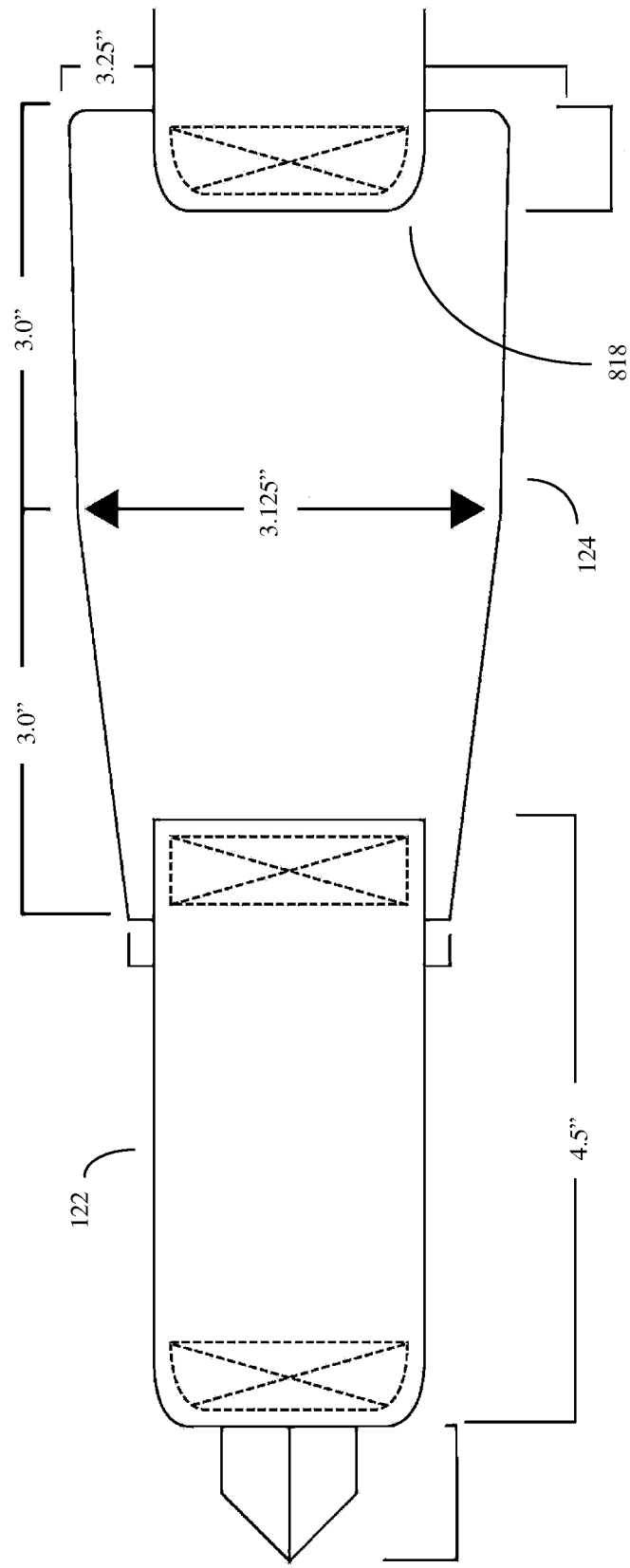
FIG. 9 shows the pattern used to construct the second camera strap.

FIG. 9 shows an example of one type of pattern that may be used to construct the second camera strap. The second camera strap can be at least partially composed of a material such as neoprene, and this section can be used as a camera protection pad (124). Another part of the second camera strap can be composed of a fabric hook-and-loop fastener material (122), which can be used to form the unattached third camera tongue end of the second camera strap. The second camera strap may in turn be attached to end (818) of the fabric hook and loop fastener layer (800) by stitching or other adhesive process. In some embodiments, an optional fabric loop (300) may be placed at the third tongue end of the second camera strap (140).

Thus in one aspect, the invention is a device for mounting a handheld camera to a wrist or arm. The device will typically comprise a first wrist strap with a tongue first end, a buckle second end, a middle section positioned midway between the tongue first end and the buckle second end, and an integrated hinged camera mounting bracket positioned in this middle section. The integrated hinged camera mounting bracket will often be comprised of a generally non-bendable support with an integrated (or detachable) camera mounting screw. This camera mounting screw will typically have a thread size and diameter that is capable of interfacing with a tripod socket of a handheld portable camera, and securing the camera to the integrated hinged camera mounting bracket. The first wrist strap will typically be of sufficient length to pass around the wrist or arm of the user, with enough excess length to enable the first tongue end to be securely fastened to the buckle second end, thereby fastening said first wrist strap to the user's arm.

Often, the tongue first end of the device will comprise a first fabric hook-and-loop fastener surface. Further, often at least some of the middle section will comprise a complementary fabric hook-and-loop fastener surface, wherein when the first tongue end is fastened around the buckle second end, resulting in the first fabric hook-and-loop fastener surface coming into contact with the complementary fabric hook-and-loop fastener surface, the two surfaces will bind tightly to each other, thereby securely fastening said first strap to the user's arm.

Often, the device will also have a second camera strap attached, by one end, to the middle section of the first wrist strap in a location between the integrated hinged camera mounting bracket and the tongue first end of the first wrist strap. This second camera strap will often have an unattached third camera tongue end. This second camera strap will often have sufficient length so that when a handheld portable camera is attached to the integrated hinged camera mounting bracket using the camera mounting screw, the second camera strap may be positioned to pass over the integrated hinged camera mounting bracket and the handheld portable camera. This second camera strap can then be further secured to the first wrist strap by the unattached third camera tongue end, thereby protecting and stabilizing the handheld portable camera.

In some embodiments, this unattached third camera tongue end of the second camera strap will additionally comprises a second fabric hook-and-loop fastener surface so that the unattached third camera tongue end of the second camera strap may be securely attached to at least one complementary fabric hook-and-loop fastener surface attached to the first wrist strap.

In some embodiments, at least part of the second camera strap midway between the end of the attachment of the second camera strap to the first wrist strap, and the unattached third camera tongue end, will comprises a camera protection pad that may be substantially the width of a typical hand held portable camera, and may be of sufficient length to substantially cover much of the front, and optionally also the top side and bottom sides, of a typical hand held portable camera.

For example, in one specific embodiment, this camera protection pad may have dimensions between 2½" and 4" wide, and a length of between 4" and 7".

As previously discussed, usually the camera mounting screw used to mount the camera to the will conform to standard tripod diameters and screw thread specification, which typically are ¼" diameter screws with 20 threads per inch. In alternative embodiments, the first wrist strap or the integrated hinged camera mounting bracket may have a quick release fixture designed to capture and release another fixture that screws to the tripod socket of the portable camera using this camera mounting screw. In this case, action of a quick release lever, button, or other device can then be used to quickly attach and detach the camera from the device.

In some embodiments, the integrated hinged camera mounting bracket will comprise a generally non-bendable ("stiff") support comprising a loop of bendable fabric containing an insert of a stiffer material. This stiffer material may be bonded or stitched, or otherwise attached to the interior of the bendable loop of fabric. In some embodiments, the hinge may be comprised of a bendable region of this loop of bendable fabric, which is attached to the first wrist strap.

In some embodiments at least one hole will be punched through this integrated hinged camera mounting bracket. In some embodiments, at least one eyelet may be placed through said at least one hole, and the camera mounting screw will pass through this at least one eyelet. Often, in order to accommodate a variety of different camera types that may have their tripod sockets located in different positions, it will be useful to punch or place multiple holes through this integrated hinged camera mounting bracket, and that hole that best corresponds to the tripod socket location in the particular camera being used can thus be selected, and the camera mounting screw placed in that location.

In some embodiments, it may be useful to also place one or more wing flaps to at least one side edge of the middle section of the first wrist strap in a position between the integrated hinged camera mounting bracket, and the tongue first end. In some embodiments, the one or more wing flaps may comprise a fabric hook-and-loop fastener surface, wherein when the tongue of the first end is fastened to the buckle second end, thereby fastening the first wrist strap to the arm of the user. This at least one wing flap may then be folded over to rest on top of (and adhere to) a portion of the tongue end of the first wrist strap that comprises a complementary hook-and-loop fastener surface. This will help fasten the first wrist strap to the arm of the user by an additional mechanism, thereby enhancing the security of the connection between said first tongue and said buckle second end of the first wrist strap.

The invention claimed is:

1. A device for mounting a handheld camera on a wrist or arm of a human user, comprising:
    a first wrist strap with a tongue first end, a buckle second end, a middle section positioned midway between said tongue first end and said buckle second end, and an integrated hinged camera mounting bracket positioned in said middle section;
    said integrated hinged camera mounting bracket comprising a generally non-bendable support with a camera mounting screw;
    said camera mounting screw having a thread size and diameter that is capable of interfacing with a tripod socket of a handheld portable camera, and securing said camera to said integrated hinged camera mounting bracket;
    said first wrist strap being of sufficient length to pass around the wrist or arm of the human user, with enough excess length to enable said first tongue end to be securely fastened to said buckle second end, thereby fastening said first wrist strap to the wrist or arm of said human user.

2. The device of claim 1, wherein said tongue first end additionally comprises a first fabric hook-and-loop fastener surface and at least some of said middle section comprises a complementary fabric hook-and-loop fastener surface, wherein when said first tongue end is fastened around said buckle second end, said first fabric hook-and-loop fastener surface comes into contact with said complementary fabric hook-and-loop fastener surface, thereby securely fastening said first strap to the arm of said human user.

3. The device of claim 1, further comprising a second camera strap attached to said middle section of said first wrist strap in a location between said integrated hinged camera mounting bracket and said tongue first end of said first wrist strap;
    said second camera strap having an unattached third camera tongue end;
    said second camera strap having sufficient length so that when a handheld portable camera is attached to said integrated hinged camera mounting bracket using said camera mounting screw, said second camera strap may be positioned to pass over said integrated hinged camera mounting bracket and said handheld portable camera can be further secured to said wrist strap by said unattached third camera tongue end, thereby protecting and stabilizing said handheld portable camera.

4. The device of claim 3, wherein the unattached third camera tongue end of said second camera strap additionally comprises a second fabric hook-and-loop fastener surface whereby said unattached third camera tongue end of said second camera strap may be attached to at least one complementary fabric hook-and-loop fastener surface attached to said first wrist strap.

5. The device of claim 3, wherein at least part of said camera strap midway between the end of attachment of said camera strap to said first wrist strap, and said unattached third camera tongue end, comprises a camera protection pad that is substantially the width of a typical hand held portable camera, and is of sufficient length to substantially cover the front, top side and bottom sides of a typical hand held portable camera.

6. The device of claim 5, wherein said width of said camera protection pad is between 2 ½" and 4", and said length of said camera protection pad is between 4" and 7".

7. The device of claim 1, wherein said integrated hinged camera mounting bracket has a hinge comprised of materials selected from the group consisting of fabric, rubber, plastic, and metal, and wherein said hinge of said integrated hinged camera mounting bracket is positioned at either an angle parallel to the direction of said user's arm when the device is worn by said user, or at an angle perpendicular to the direction of said user's arm when the device is worn by said user.

8. The device of claim 1, wherein said integrated hinged camera mounting bracket comprises a generally non-bendable support comprising a loop of bendable fabric containing an insert of a stiffer material, said stiffer material being bonded to the interior of said bendable loop of fabric, and said hinge is comprised of a bendable region of this loop of bendable fabric that is attached to said first wrist strap.

9. The device of claim 8, wherein at least one hole is punched through said integrated hinged camera mounting bracket, at least one eyelet is placed through said at least one hole, and said screw passes through at least one eyelet.

10. The device of claim 1, further comprising at least one wing flap affixed to at least one side edge of said middle section said first wrist strap in a position between said integrated hinged camera mounting bracket and said tongue first end, said at least one wing flap comprising a fabric wing flap hook-and-loop fastener surface, wherein when said tongue first end is fastened to said buckle second end, thereby fastening said first wrist strap to the arm of said human user, said at least one wing flap may be folded to rest on top of a portion of the tongue end of said first wrist strap that comprises a complementary hook-and-loop fastener surface, thereby fastening said first wrist strap to the wrist or arm of said human user by an additional mechanism, thereby enhancing the security of the connection between said first tongue and said buckle second end of said first wrist strap.

11. A device for mounting a handheld camera on a wrist or arm of a human user, comprising:
a first wrist strap with a tongue first end, a buckle second end, a middle section positioned midway between said tongue first end and said buckle second end, and an integrated hinged camera mounting bracket positioned in said middle section;
said integrated hinged camera mounting bracket comprising a generally non-bendable support with a camera mounting screw;
said camera mounting screw having a thread size and diameter that is capable of interfacing with a tripod socket of a handheld portable camera, and securing said camera to said integrated hinged camera mounting bracket;
said first wrist strap being of sufficient length to pass around the wrist or arm of said human user, with enough excess length to enable said first tongue end to be securely fastened to said buckle second end, thereby fastening said first wrist strap to the wrist or arm of said human user;
wherein said tongue first end additionally comprises a first fabric hook-and-loop fastener surface and at least some of said middle section comprises a complementary fabric hook-and-loop fastener surface, wherein when said first tongue end is fastened around said buckle second end, said first fabric hook-and-loop fastener surface comes into contact with said complementary fabric hook-and-loop fastener surface, thereby securely fastening said first strap to the wrist or arm of said human user;
wherein said integrated hinged camera mounting bracket comprises a generally non-bendable support comprising a loop of bendable fabric containing an insert of a stiffer material, said stiffer material being bonded to the interior of said bendable loop of fabric, and said hinge is comprised of a bendable region of this loop of bendable fabric that is attached to said first wrist strap; and
wherein at least one hole is punched through said integrated hinged camera mounting bracket, at least one eyelet is placed through said at least one hole, and said screw passes through at least one eyelet.

12. The device of claim 11, further comprising a second camera strap attached to said middle section of said first wrist strap in a location between said integrated hinged camera mounting bracket and said tongue first end of said first wrist strap;
said second camera strap having an unattached third camera tongue end;
said second camera strap having sufficient length so that when a handheld portable camera is attached to said integrated hinged camera mounting bracket using said camera mounting screw, said second camera strap may be positioned to pass over said integrated hinged camera mounting bracket and said handheld portable camera can be further secured to said wrist strap by said unattached third camera tongue end, thereby protecting and stabilizing said handheld portable camera.

13. The device of claim 12, wherein the unattached third camera tongue end of said second camera strap additionally comprises a second fabric hook-and-loop fastener surface whereby said unattached third camera tongue end of said second camera strap may be attached to at least one complementary fabric hook-and-loop fastener surface attached to said first wrist strap.

14. The device of claim 12, wherein at least part of said camera strap midway between the end of attachment of said camera strap to said first wrist strap, and said unattached third camera tongue end, comprises a camera protection pad that is substantially the width of a typical hand held portable camera, and is of sufficient length to substantially cover the front, top side and bottom sides of a typical hand held portable camera.

15. The device of claim 14, wherein said width of said camera protection pad is between 2½" and 4", and said length of said camera protection pad is between 4" and 7".

16. The device of claim 11, wherein said screw is a ¼" diameter screw with 20 threads per inch.

17. A device for mounting a handheld camera on a wrist or arm of a human user, comprising:
a first wrist strap with a tongue first end, a buckle second end, a middle section positioned midway between said tongue first end and said buckle second end, and an integrated hinged camera mounting bracket positioned in said middle section;
said integrated hinged camera mounting bracket comprising a generally non-bendable support with a camera mounting screw;
said camera mounting screw having a thread size and diameter that is capable of interfacing with a tripod socket of a handheld portable camera, and securing said camera to said integrated hinged camera mounting bracket;
said first wrist strap being of sufficient length to pass around the wrist or arm of said human user, with enough excess length to enable said first tongue end to be securely fastened to said buckle second end, thereby fastening said first wrist strap to the wrist or arm of said human user;
wherein said tongue first end additionally comprises a first fabric hook-and-loop fastener surface and at least some of said middle section comprises a complementary fabric hook-and-loop fastener surface, wherein when said first tongue end is fastened around said buckle second end, said first fabric hook-and-loop fastener surface comes into contact with said complementary fabric hook-and-loop fastener surface, thereby securely fastening said first strap to the wrist or arm of said human user;
wherein said integrated hinged camera mounting bracket comprises a generally non-bendable support comprising a loop of bendable fabric containing an insert of a stiffer material, said stiffer material being bonded to the interior of said bendable loop of fabric, and said hinge is comprised of a bendable region of this loop of bendable fabric that is attached to said first wrist strap;

wherein at least one hole is punched through said integrated hinged camera mounting bracket, at least one eyelet is placed through said at least one hole, and said screw passes through at least one eyelet;

further comprising a second camera strap attached to said middle section of said first wrist strap in a location between said integrated hinged camera mounting bracket and said tongue first end of said first wrist strap;

said second camera strap having an unattached third camera tongue end;

said second camera strap having sufficient length so that when a handheld portable camera is attached to said integrated hinged camera mounting bracket using said camera mounting screw, said second camera strap may be positioned to pass over said integrated hinged camera mounting bracket and said handheld portable camera can be further secured to said wrist strap by said unattached third camera tongue end, thereby protecting and stabilizing said handheld portable camera;

wherein the unattached third camera tongue end of said second camera strap additionally comprises a second fabric hook-and-loop fastener surface whereby said unattached third camera tongue end of said second camera strap may be attached to at least one complementary fabric hook-and-loop fastener surface attached to said first wrist strap; and wherein at least part of said camera strap midway between the end of attachment of said camera strap to said first wrist strap, and said unattached third camera tongue end, comprises a camera protection pad that is substantially the width of a typical hand held portable camera, and is of sufficient length to substantially cover the front, top side and bottom sides of a typical hand held portable camera.

18. The device of claim 17, wherein said width of said camera protection pad is between 2½" and 4", and said length of said camera protection pad is between 4" and 7".

19. The device of claim 17, wherein said screw is a ¼" diameter screw with 20 threads per inch.

20. The device of claim 17, further comprising at least one wing flap affixed to at least one side edge of said middle section said first wrist strap in a position between said integrated hinged camera mounting bracket and said tongue first end, said at least one wing flap comprising a fabric wing flap hook-and-loop fastener surface, wherein when said tongue first end is fastened to said buckle second end, thereby fastening said first wrist strap to the wrist or arm of said human user, said at least one wing flap may be folded to rest on top of a portion of the tongue end of said first wrist strap that comprises a complementary hook-and-loop fastener surface, thereby fastening said first wrist strap to the wrist or arm of said human user by an additional mechanism, thereby enhancing the security of the connection between said first tongue and said buckle second end of said first wrist strap.

* * * * *